(12) United States Patent
Yamaguchi (10) Patent No.: US 12,441,182 B2
(45) Date of Patent: Oct. 14, 2025

(54) VEHICLE SPEED CONTROL DEVICE AND DRIVER MODEL PROCESSING DEVICE

(71) Applicant: MEIDENSHA CORPORATION, Tokyo (JP)

(72) Inventor: Takashi Yamaguchi, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/580,957

(22) PCT Filed: Jul. 15, 2022

(86) PCT No.: PCT/JP2022/027880
§ 371 (c)(1),
(2) Date: Sep. 25, 2024

(87) PCT Pub. No.: WO2023/002950
PCT Pub. Date: Jan. 26, 2023

(65) Prior Publication Data
US 2025/0018789 A1    Jan. 16, 2025

(30) Foreign Application Priority Data
Jul. 19, 2021   (JP) ................................. 2021-118742

(51) Int. Cl.
*B60K 31/02*   (2006.01)
*B60K 26/02*   (2006.01)
*B60T 7/12*    (2006.01)

(52) U.S. Cl.
CPC .............. *B60K 31/02* (2013.01); *B60K 26/02* (2013.01); *B60T 7/12* (2013.01); *B60T 2250/04* (2013.01); *B60Y 2300/143* (2013.01)

(58) Field of Classification Search
None
See application file for complete search history.

(56) References Cited

U.S. PATENT DOCUMENTS

2018/0186374 A1*  7/2018  Ando ................... G05D 1/0088

FOREIGN PATENT DOCUMENTS

| JP | 2002014010 | A | * | 1/2002 |
|----|------------|---|---|--------|
| JP | 2015125004 | A |   | 7/2015 |
| JP | 6090153    | B2 |  | 3/2017 |
| JP | 2017133956 | A |   | 8/2017 |
| JP | 2019215287 | A |   | 12/2019 |

\* cited by examiner

*Primary Examiner* — Adam D Tissot
(74) *Attorney, Agent, or Firm* — Muncy, Geissler, Olds & Lowe, P.C.

(57) ABSTRACT

This vehicle speed control device includes: a driving force command generation unit that generates a driving force command FcmD on the basis of the actual vehicle speed V of the vehicle and a vehicle speed command Vcmd; an accelerator control unit that generates an opening degree command θAC for the accelerator pedal on the basis of the driving force command Fcmd; a brake control unit that generates an opening degree command θBK for the brake pedal on the basis of the driving force command Fcmd; and a step change control unit that selects, on the basis of the driving force command Fcmd, whether to perform an acceleration control mode in which the opening degree command θAC is input to the drive robot, or a brake control mode in which the opening degree command θBK is input to the drive robot.

9 Claims, 4 Drawing Sheets

VEHICLE SPEED CONTROL DEVICE AND DRIVER MODEL PROCESSING DEVICE

TECHNICAL FIELD

The present invention relates to a vehicle speed control device and a driver model processing device. More specifically, the present invention relates to a vehicle speed control device, which controls vehicle speed by driving a drive robot that operates an accelerator pedal and a brake pedal of a vehicle, and also relates to a driver model processing device, which simulates operations to be performed on an accelerator pedal and a brake pedal by a driver.

BACKGROUND ART

Vehicle testing such as durability testing, exhaust purification performance evaluation testing, and fuel consumption measurement testing are performed by actually running a real vehicle on rollers of a chassis dynamometer, for example. In a development stage of a vehicle, driving of the actual vehicle may be performed by a drive robot in place of a human. The vehicle speed control device generates operation amount commands over the accelerator pedal, the brake pedal, and the like on the basis of vehicle speed commands that are time series data of vehicle speeds to be achieved by the vehicle, and the drive robots operates an accelerator pedal and a brake pedal of the vehicle by driving actuators on the basis of the operation amount commands.

A vehicle speed control device disclosed in Patent Document 1 includes an acceleration controller, a constant speed controller, a deceleration controller, and a selector. The acceleration controller calculates an accelerator pedal operation amount in an acceleration state on the basis of a vehicle speed command and actual vehicle speed. The constant speed controller calculates an accelerator pedal operation amount in a constant speed running state on the basis of the vehicle speed command and actual vehicle speed. The deceleration controller calculates a brake pedal operation amount in a deceleration state on the basis of the vehicle speed command and actual vehicle speed. The selector selects an acceleration control method to be performed by the acceleration controller, a constant speed control method to be performed by the constant speed controller, or a deceleration control method to be performed by the deceleration controller, as a control method to be performed at each time on the basis of the vehicle speed command.

The selector according to Patent Document 1 selects the acceleration control method as the control method in a case where acceleration is larger than a positive threshold. The selector selects the deceleration control method as the control method in a case where acceleration is smaller than a negative threshold. The selector selects the constant speed control method as the control method in a case where acceleration is in between the negative threshold and the positive threshold. The acceleration is a slope of the vehicle speed command obtained at each time.

Patent Document 1: Japanese Patent No. 6090153

DISCLOSURE OF THE INVENTION

Problems to be Solved by the Invention

As described above, the technology disclosed in Patent Document 1 selects among the control methods depending on the vehicle speed command (in other words, running pattern). This means that, the vehicle speed control device according to Patent Document 1 uniquely decides a pedal switch point depending on preset running patterns regardless of features of the vehicle or situations of the actual vehicle. The pedal switch point is a time when switching between the accelerator pedal and the brake pedal. Therefore, when using the technology according to Patent Document 1, there is a possibility that the pedal switching between the accelerator pedal and the brake pedal may become unnatural.

It is an object of the present invention to provide a vehicle speed control device and driver model processing device that make it possible to achieve natural pedal switching between the accelerator pedal and the brake pedal.

Means for Solving the Problems (1) A vehicle speed control device (for example, vehicle speed control device 2) according to the present invention controls vehicle speed by driving a drive robot (for example, drive robot 3 to be described later) that operates an accelerator pedal and a brake pedal of a vehicle. The vehicle speed control device includes: a driving force command generator (for example, driving force command generator 20 to be described later) that generates a driving force command (for example, driving force command Fcmd to be described later) over the vehicle on the basis of actual vehicle speed (for example, actual vehicle speed V to be described later) of the vehicle and a vehicle speed command (for example, vehicle speed command Vcmd) over the actual vehicle speed; an accelerator controller (for example, accelerator controller 22 to be described later) that generates an accelerator operation amount command (for example, opening degree command θAC to be described later) over an accelerator pedal operation amount on the basis of the driving force command; a brake controller (for example, brake controller 24 to be described later) that generates a brake operation amount command (for example, opening degree command θBK to be described later) over a brake pedal operation amount on the basis of the driving force command; and a pedal switch controller (for example, pedal switch controller 26 to be described later) that selects, on the basis of the driving force command, an accelerator control mode in which the accelerator operation amount command is input to the drive robot or a brake control mode in which the brake operation amount command is input to the drive robot.

(2) In this case, the driving force command generator preferably includes a basic driving force calculator (for example, basic driving force calculator 201 to be described later) that calculates basic driving force (for example, basic driving force Fbs to be described later) on the basis of the vehicle speed command and vehicle weight, a feedback controller (for example, feedback controller 202 to be described later) that calculates corrective driving force (for example, corrective driving force Ffb to be described later) on the basis of a deviation (for example, vehicle speed deviation e to be described later) between the vehicle speed command and the actual vehicle speed, and an adder (for example, adder 203 to be described later) that outputs a sum of the basic driving force and the corrective driving force as the driving force command.

(3) In this case, the accelerator controller preferably generates the accelerator operation amount command by inputting the actual vehicle speed and the driving force command to an accelerator control map (for example, accelerator control map Mac to be described later) that associates generated driving force of the vehicle with the accelerator pedal operation amounts at respective vehicle speeds.
(4) In this case, the brake controller preferably generates the brake operation amount command by inputting the actual vehicle speed and the driving force command to a brake control map (for example, brake control map Mbk to be described later) that associates generated driving force of the vehicle with the brake pedal operation amounts at respective vehicle speeds.
(5) In this case, the accelerator controller preferably generates the accelerator operation amount command by inputting the actual vehicle speed and the driving force command to an accelerator control map (for example, accelerator control map Mac to be described later) that associates generated driving force of the vehicle with the accelerator pedal operation amounts at respective vehicle speeds, and the brake controller preferably generates the brake operation amount command by inputting the actual vehicle speed and the driving force command to a brake control map (for example, brake control map Mbk to be described later) that associates the generated driving force with the brake pedal operation amounts at respective vehicle speeds.
(6) In this case, the pedal switch controller preferably selects the accelerator control mode in a case where the driving force command is larger than an acceleration/deceleration determination value (for example, acceleration/deceleration determination value Fac to be described later), but the pedal switch controller preferably selects the brake control mode in a case where the driving force command is smaller than the acceleration/deceleration determination value.
(7) In this case, the pedal switch controller preferably switches the control mode to the brake control mode in a case where the driving force command falls below a first pedal switch threshold (for example, first pedal switch threshold Fth1 to be described later) that is set to a value smaller than the acceleration/deceleration determination value in a situation where the accelerator control mode is selected as the control mode, but the pedal switch controller preferably switches the control mode to the accelerator control mode in a case where the driving force command exceeds a second pedal switch threshold (for example, second pedal switch threshold Fth2 to be described later) that is set to a value larger than the acceleration/deceleration determination value in a situation where the brake control mode is selected as the control mode.
(8) In this case, the pedal switch controller preferably changes the acceleration/deceleration determination value, the first pedal switch threshold, and the second pedal switch threshold depending on the actual vehicle speed.
(9) In this case, the pedal switch controller preferably changes a difference between the first pedal switch threshold and the second pedal switch threshold depending on a value of a control parameter (for example, integral gain Ki to be described later) included in the feedback controller.
(10) A driver model processing device (for example, driver model processing device 70 to be described later) according to the present invention simulates operations to be performed on an accelerator pedal and a brake pedal of a vehicle by a driver. The driver model processing device includes: a driving force command generator (for example, driving force command generator 71 to be described later) that generates a driving force command over the vehicle on the basis of actual vehicle speed (for example, actual vehicle speed V to be described later) of the vehicle and a vehicle speed command (for example, vehicle speed command Vcmd) over the actual vehicle speed; an accelerator controller (for example, accelerator controller 72 to be described later) that generates an accelerator operation amount command (for example, opening degree command θAC to be described later) over an accelerator pedal operation amount on the basis of the driving force command; a brake controller (for example, brake controller 74 to be described later) that generates a brake operation amount command (for example, opening degree command θBK to be described later) over a brake pedal operation amount on the basis of the driving force command; and a pedal switch controller (for example, pedal switch controller 76 to be described later) that selects, on the basis of the driving force command, an accelerator control mode in which the accelerator controller is turned on or a brake control mode in which the brake controller is turned on.

Effects of the Invention (1) A vehicle speed control device according to the present invention includes: a driving force command generator that generates a driving force command over a vehicle on the basis of actual vehicle speed and a vehicle speed command; an accelerator controller that generates an accelerator operation amount command on the basis of the driving force command; a brake controller that generates a brake operation amount command on the basis of the driving force command; and a pedal switch controller that selects, on the basis of the driving force command, an accelerator control mode in which the accelerator operation amount command is input to the drive robot or a brake control mode in which the brake operation amount command is input to the drive robot. In other words, according to the present invention, it is possible to switch between the accelerator pedal and the brake pedal at a natural timing depending on situations of the vehicle by selecting a control mode on the basis of the driving force command generated by the driving force command generator on the basis of the vehicle speed command and the actual vehicle speed.
(2) The driving force command generator of the vehicle speed control device according to the present invention outputs a sum of a basic driving force and a corrective driving force as the driving force command. The basic driving force is calculated on the basis of the vehicle speed command and vehicle weight. The corrective driving force is calculated on the basis of a deviation between the vehicle speed command and the actual vehicle speed. According to the present invention, it is possible to switch between the accelerator pedal and the brake pedal at a natural timing depending on situations of the vehicle and change in the vehicle speed command by selecting a control mode on the basis of the driving force command including the corrective driving force calculated by the feedback controller.
(3) The accelerator controller of the vehicle speed control device according to the present invention generates the accelerator operation amount command by inputting the actual vehicle speed and the driving force command to an accelerator control map that associates generated driving force with the accelerator pedal operation amounts at respective vehicle speeds. According to the present invention, it is possible to speed up a response of the accelerator pedal to the command by inputting the driving force command generated by using the feedback controller into the accelerator control map and generating the accelerator operation amount command.

(4) The brake controller of the vehicle speed control device according to the present invention generates the brake operation amount command by inputting the actual vehicle speed and the driving force command to a brake control map that associates the generated driving force with the brake pedal operation amounts at respective vehicle speeds. According to the present invention, it is possible to speed up a response of the brake pedal to the command by inputting the driving force command generated by using the feedback controller into the accelerator control map and generating the brake operation amount command.

(5) The accelerator controller and the brake controller of the vehicle speed control device according to the present invention generate the accelerator operation amount command and the brake operation amount command by inputting the actual vehicle speed and the driving force command to their respective control maps. According to the present invention, it is possible to speed the responses of both the accelerator pedal and the brake pedal to the commands by generating the accelerator operation amount command and the brake operation amount command on the basis of the control maps. In addition, according to the present invention, the feedback controller based on the deviation between the actual vehicle speed and the vehicle speed command can be shared between the accelerator controller and the brake controller. This makes it easier to adjust the control parameter than a case where respective feedback controllers are individually installed for the accelerator controller and the brake controller.

(6) The pedal switch controller of the vehicle speed control device according to the present invention selects the accelerator control mode in a case where the driving force command is larger than an acceleration/deceleration determination value, but the pedal switch controller selects the brake control mode in a case where the driving force command is smaller than the acceleration/deceleration determination value. According to the present invention, it is possible to select an optimal control mode for each time through simple computation by the pedal switch controller.

(7) The pedal switch controller of the vehicle speed control device according to the present invention switches the control mode to the brake control mode in a case where the driving force command falls below a first pedal switch threshold that is smaller than the acceleration/deceleration determination value in a situation where the accelerator control mode is selected, but the pedal switch controller switches the control mode to the accelerator control mode in a case where the driving force command exceeds a second pedal switch threshold that is larger than the acceleration/deceleration determination value in a situation where the brake control mode is selected. According to the present invention, it is possible to prevent the control modes to be sensitively switched by setting a hysteresis width between the first pedal switch threshold and the second pedal switch threshold. The first pedal switch threshold is used when the control mode is switched from the accelerator control mode to the brake control mode. The second pedal switch threshold is used when the control mode is switched from the brake control mode to the accelerator control mode.

(8) The pedal switch controller of the vehicle speed control device according to the present invention changes the acceleration/deceleration determination value, the first pedal switch threshold, and the second pedal switch threshold depending on the actual vehicle speed. This makes it possible to switch between the accelerator pedal and the brake pedal at an appropriate timing in consideration of features of the vehicle.

(9) The pedal switch controller of the vehicle speed control device according to the present invention changes a difference (that is, the hysteresis width) between the first pedal switch threshold and the second pedal switch threshold depending on a value of gain included in the feedback controller. This makes it possible to omit adjustment of the hysteresis width that is made each time the value of the control parameter of the feedback controller is changed, and it becomes easier for a user to do tuning.

(10) The driver model processing device according to the present invention includes: the driving force command generator that generates a driving force command over a vehicle on the basis of actual vehicle speed and a vehicle speed command; the accelerator controller that generates an accelerator operation amount command on the basis of the driving force command; the brake controller that generates a brake operation amount command on the basis of the driving force command; and the pedal switch controller that selects, on the basis of the driving force command, the accelerator control mode in which the accelerator controller is turned on or the brake control mode in which the brake controller is turned on. In other words, according to the present invention, it is possible to simulate a pedal switch operation to be performed by a driver between the accelerator pedal and the brake pedal at a natural timing depending on situations of the vehicle, by selecting a control mode on the basis of the driving force command generated by the driving force command generator on the basis of the vehicle speed command and the actual vehicle speed.

PREFERRED MODE FOR CARRYING OUT THE INVENTION

First Embodiment

Figure 1:
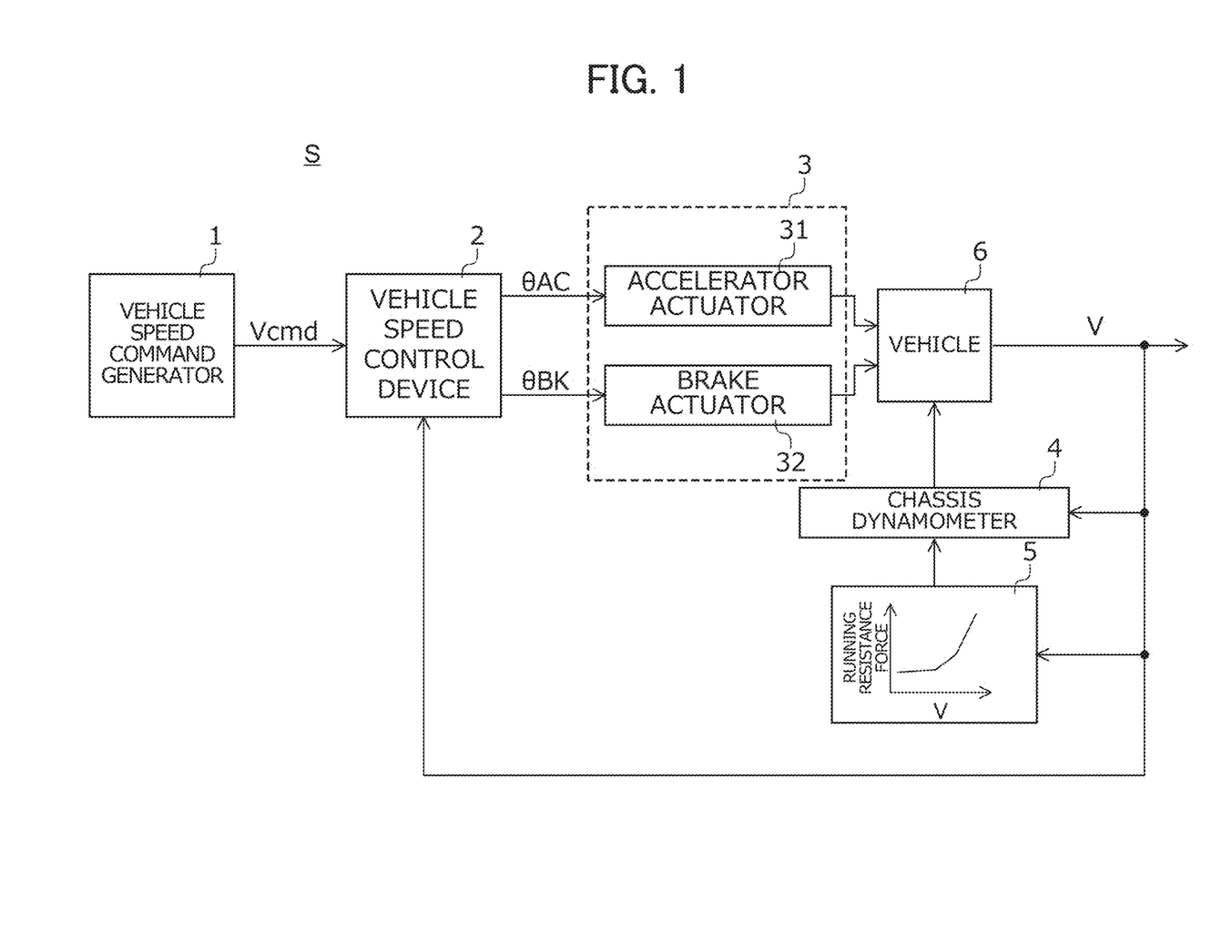
FIG. 1 is a diagram illustrating a configuration of a control system of a vehicle testing system including a drive robot and its control device according to a first embodiment of the present invention.

Hereinafter, a first embodiment of the present invention will be described with reference to the drawings. FIG. 1 is a diagram illustrating a configuration of a control system of a vehicle testing system S including a drive robot 3 and a vehicle speed control device 2 according to the present embodiment. The vehicle speed control device 2 is a control device of the drive robot 3. The vehicle testing system S includes a vehicle 6 that is a subject under test, a vehicle speed command generator 1 that generates a vehicle speed command of a vehicle speed to be achieved by the vehicle 6, a vehicle speed control device 2 that controls the vehicle speed by driving the drive robot 3, a chassis dynamometer 4 mounted with the vehicle 6, and a running resistance force control device 5 that controls the chassis dynamometer 4.

The drive robot 3 includes a plurality of actuators that operate devices required to cause the vehicle 6 to run such as an accelerator pedal, a brake pedal, a shift lever and an ignition switch of the vehicle 6. Among the plurality of actuators of the drive robot 3, FIG. 1 only illustrates an accelerator actuator 31 that operates the accelerator pedal, and a brake actuator 32 that operates the brake pedal.

When an opening degree command θAC [%] corresponding to a command over an accelerator pedal opening degree (accelerator pedal operation amount) is input from the vehicle speed control device 2, the accelerator actuator 31 adjusts the opening degree of the accelerator pedal depending on the opening degree command θAC.

When an opening degree command θBK [%] corresponding to a command over a brake pedal opening degree (brake pedal operation amount) is input from the vehicle speed control device 2, the brake actuator 32 adjusts the opening degree of the brake pedal depending on the opening degree command θBK. Note that, in this embodiment, percentages are used as units of opening degrees of the accelerator pedal and the brake pedal. However, the units of the opening degrees may be angles of the pedals.

When the drive robot 3 provided with the above-described actuators 31 and 32 operates the accelerator pedal, the brake pedal, or the like, the vehicle 6 generate driving force depending on the operation amounts of related to these pedals. The chassis dynamometer 4 performs control on the basis of the running resistance computed by the running resistance force control device 5 depending on an actual vehicle speed V [km/h], etc. of the vehicle 6. Note that, the chassis dynamometer 4 is provided with an encoder (not illustrated) that detects the number of rotations of a roller in contact with a tire of the vehicle 6. The actual vehicle speed V is calculated by using output from the encoder, the radius of the roller, or the like.

The running resistance force control device 5 computes the running resistance depending on the actual vehicle speed V of the vehicle 6. This running resistance force is a value imitating external force that can act on the vehicle 6 during actual running such as air resistance force, rolling resistance force, slope resistance force, and inertia corresponding to vehicle weight. This running resistance force is set in such a manner that the running resistance force increases as the actual vehicle speed V of the vehicle 6 increases, as schematically illustrated in FIG. 1, for example.

The vehicle speed command generator 1 generates a vehicle speed command Vcmd [km/h] and inputs the generated command to the vehicle speed control device 2. The vehicle speed command Vcmd [km/h] corresponds to a vehicle speed to be achieved by the vehicle 6 at each time, that is, a goal value of the actual vehicle speed V.

The vehicle speed control device 2 calculates the opening degree command over the accelerator actuator 31 and the opening degree command θBK over the brake actuator 32 on the basis of the actual vehicle speed V and the vehicle speed command Vcmd over the actual vehicle speed V, inputs the opening degree commands θAC and θBK to the drive robot 3, and thereby drives the drive robot 3 in such a manner that the actual vehicle speed V becomes the vehicle speed command Vcmd. Here, most people do not step on both the accelerator pedal and the brake pedal at a same time, but perform operations while switching between the pedals by using a single foot. Therefore, to simulate the pedal switch operation to be performed by a human between the accelerator pedal and the brake pedal, the vehicle speed control device 2 selectively inputs the opening degree θAC or θBK to the drive robot 3 as will be described later.

Figure 2:
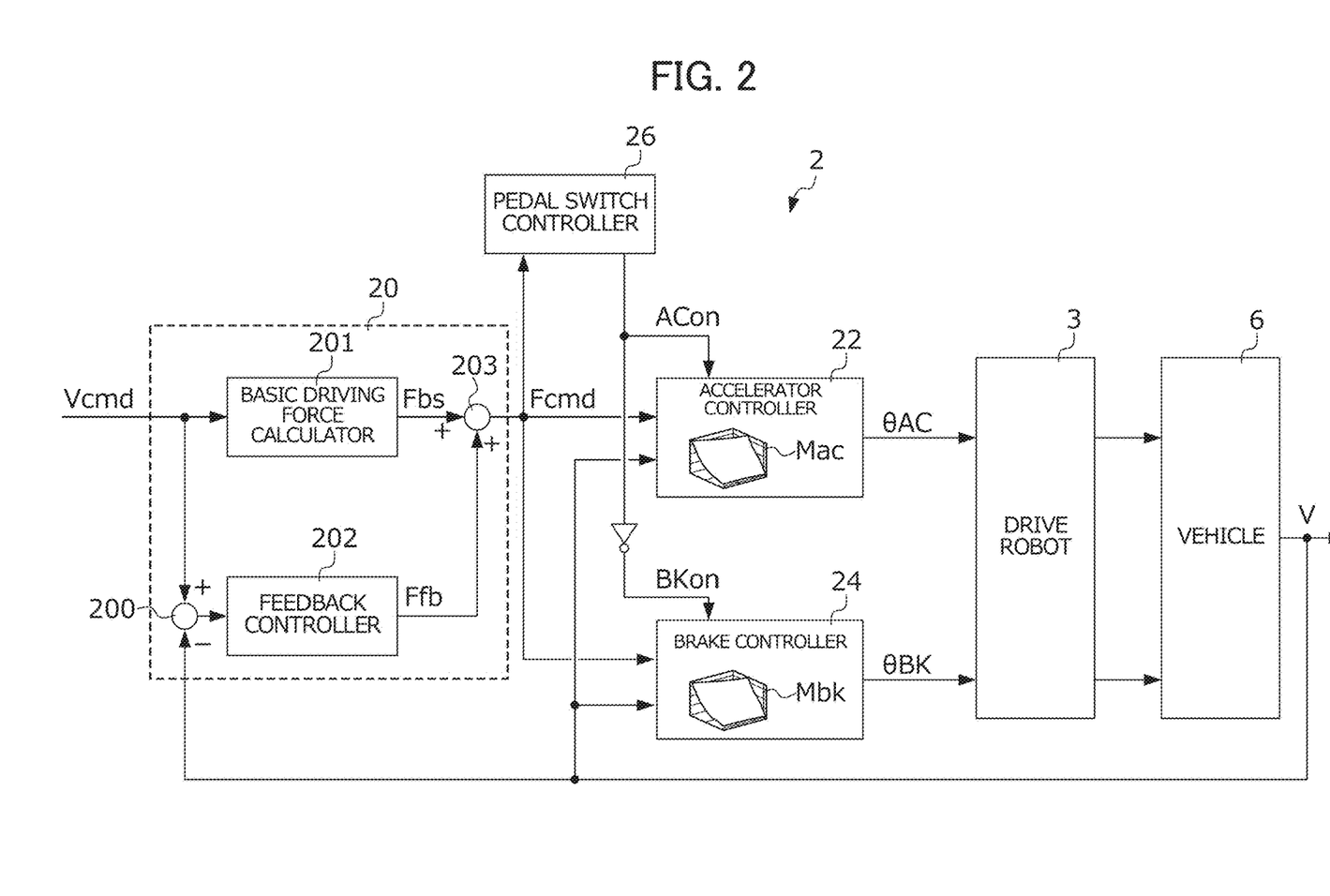
FIG. 2 is a diagram illustrating a specific configuration of a vehicle speed control device.

FIG. 2 is a diagram illustrating a specific configuration of the vehicle speed control device 2. The vehicle speed control device 2 includes a driving force command generator 20, an accelerator controller 22, a brake controller 24, and a pedal switch controller 26.

The driving force command generator 20 generates a driving force command Fcmd[N] on the basis of the actual vehicle speed V of the vehicle 6 and the vehicle speed command Vcmd over the actual vehicle speed V, and inputs the generated driving force command Fcmd[N] to the accelerator controller 22, the brake controller 24, and the pedal switch controller 26. The driving force command Fcmd[N] corresponds to a goal value of a driving force to be generated by the vehicle 6. More specifically, the driving force command generator 20 includes a vehicle speed deviation calculator 200, a basic driving force calculator 201, a feedback controller 202, and an adder 203. The driving force command generator 20 generates the driving force command Fcmd by correcting basic driving force Fbs[N] calculated by the basic driving force calculator 201 by corrective driving force Ffb[N] calculated by the feedback controller 202.

The basic driving force calculator 201 calculates the basic driving force Fbs according to a mathematical expression (1) listed below, on the basis of the vehicle speed command Vcmd and vehicle weight M [kg] that is preset weight of the vehicle 6. More specifically, the basic driving force calculator 201 calculates the basic driving force Fbs by multiplying the vehicle weight M by a value obtained by differentiating the vehicle speed command Vcmd with respect to time, and then dividing it by a coefficient 3.6 to conform dimensions. Note that, the basic driving force Fbs calculated in such a way according to the mathematical expression 1 corresponds to necessary force to be added to the vehicle having weight M to accelerate the vehicle by acceleration dVcmd/dt.

[Formula 1]

$$Fbs = \frac{M}{3.6}\frac{d}{dt}Vcmd \qquad (1)$$

The vehicle speed deviation calculator 200 calculates a vehicle speed deviation e by subtracting the actual vehicle speed V from the vehicle speed command Vcmd, and inputs the vehicle speed deviation e to the feedback controller 202.

The feedback controller 202 calculates the corrective driving force Ffb on the basis of the vehicle speed deviation e. More specifically, the feedback controller 202 calculates the corrective driving force Ffb according to a feedback control law characterized by at least one control parameter, in such a manner that the vehicle speed deviation e becomes zero. Note that, the feedback controller 202 according to the present embodiment calculates the corrective driving force Ffb according to a PI control law in which a proportional gain Kp and an integral gain Ki serve as the control parameters. However, the present invention is not limited thereto.

The adder 203 outputs a sum of the basic driving force Fbs and the corrective driving force Ffb to the accelerator controller 22, the brake controller 24, and the pedal switch controller 26, as the driving force command Fcmd.

The accelerator controller 22 generates the opening degree command θAC over the accelerator pedal on the basis of the actual vehicle speed V, the driving force command Fcmd, and an accelerator turning-on signal ACon input from the pedal switch controller 26, and inputs the generated opening degree command θAC to the drive robot 3.

More specifically, the accelerator controller 22 includes a three-dimensional accelerator control map Mac that associates generated driving force of the vehicle 6 with an opening degree of the accelerator pedal at respective vehicle speeds. The accelerator controller 22 generates the opening degree command θAC by inputting the actual vehicle speed V and the driving force command Fcmd to the accelerator control map Mac, and inputs the generated opening degree command θAC to the drive robot 3. Note that, the accelerator control map Mac is constructed by conducting a test using the vehicle 6. Only in a case where the accelerator turning-on signal ACon is turned on, the accelerator controller 22 generates the opening degree command θAC on the basis of the accelerator control map Mac and inputs the generated opening degree command θAC to the drive robot 3.

The brake controller 24 generates the opening degree command θBK over the brake pedal on the basis of the actual vehicle speed V, the driving force command Fcmd, and a brake turning-on signal BKon input from the pedal switch controller 26, and inputs the generated opening degree command θBK to the drive robot 3.

More specifically, the brake controller 24 includes a three-dimensional brake control map Mbk that associates generated driving force of the vehicle 6 with an opening degree of the brake pedal at respective vehicle speeds. The brake controller 24 generates the opening degree command θBK by inputting the actual vehicle speed V and the driving force command Fcmd to the brake control map Mbk, and inputs the generated opening degree command θBK to the drive robot 3. Note that, the brake control map Mbk is constructed by conducting a test using the vehicle 6. Only in a case where the brake turning-on signal BKon is turned on, the brake controller 24 generates the opening degree command θBK on the basis of the brake control map Mbk and inputs the generated opening degree command θBK to the drive robot 3.

As described above, it is possible for the vehicle speed control device 2 to control the drive robot 3 in at least the two control mode including the accelerator control mode in which the accelerator controller 22 generates the opening degree command θAC and inputs it to the drive robot 3 and the brake control mode in which the brake controller 24 generates the opening degree command θBK and inputs it to the drive robot 3.

The pedal switch controller 26 selects the accelerator control mode or the brake control mode by turning on or off the accelerator turning-on signal ACon and the brake turning-on signal BKon on the basis of the driving force command Fcmd and the actual vehicle speed V. The accelerator turning-on signal ACon and the brake turning-on signal BKon are binary signals. The pedal switch controller 26 complementarily switches between the signals Con and BKon. In other words, the brake turning-on signal BKon is turned off in the case where the accelerator turning-on signal ACon is turned on. The brake turning-on signal BKon is turned on in the case where the accelerator turning-on signal ACon is turned off. Therefore, to select the accelerator control mode as the control mode, the pedal switch controller 26 turns on the accelerator turning-on signal ACon and turns off the brake turning-on signal BKon. To select the brake control mode as the control mode, the pedal switch controller 26 turns off the accelerator turning-on signal ACon and turns on the brake turning-on signal BKon.

The pedal switch controller 26 selects the accelerator control mode in a case where the driving force command Fcmd is larger than an acceleration/deceleration determination value Fac[N], but the pedal switch controller 26 selects the brake control mode in a case where the driving force command Fcmd is smaller than the acceleration/deceleration determination value Fac. In addition, the pedal switch controller 26 switches the control mode from the accelerator control mode to the brake control mode in a case where the driving force command Fcmd falls below a first pedal switch threshold Fth1 that is set to a value smaller than the acceleration/deceleration determination value Fac in a situation where the accelerator control mode is selected as the control mode, but the pedal switch controller 26 switches the control mode from the brake control mode to the accelerator control mode in a case where the driving force command Fcmd exceeds a second pedal switch threshold Fth2 that is set to a value larger than the acceleration/deceleration determination value Fac in a situation where the brake control mode is selected as the control mode.

Figure 3:
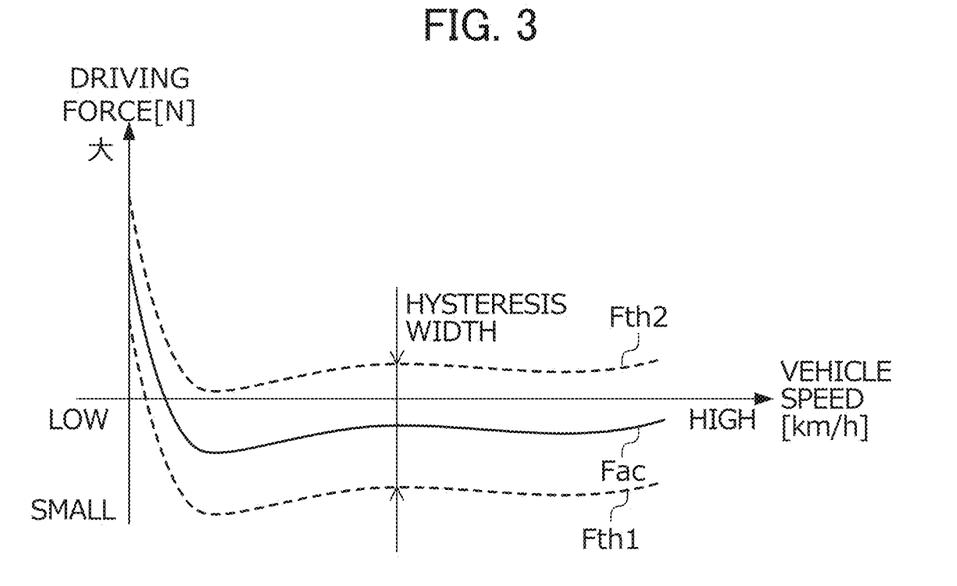
FIG. 3 is a diagram illustrating an example of setting an acceleration/deceleration determination value, a first pedal switch threshold, and a second pedal switch threshold.

FIG. 3 is a diagram illustrating an example of setting the acceleration/deceleration determination value Fac, the first pedal switch threshold Fth1, and the second pedal switch threshold Fth2 that are referenced by the pedal switch controller 26. As illustrated in FIG. 3, it is possible to prevent the control modes to be sensitively switched in response to change in the driving force command Fcmd, by setting the first pedal switch threshold Fth1 to a value smaller than the acceleration/deceleration determination value Fac and setting the second pedal switch threshold Fth2 to a value larger than the acceleration/deceleration determination value Fac. The first pedal switch threshold Fth1 is referenced when switching the control mode from the accelerator control mode to the brake control mode. The second pedal switch threshold Fth2 is referenced when switching the control mode from the brake control mode to the accelerator control mode. Hereinafter, a difference between the first pedal switch threshold Fth1 and the second pedal switch threshold Fth2 (Fth2−Fth1) is also referred to as a hysteresis width.

Meanwhile, most vehicles generate braking force (for example, engine braking) when the accelerator pedal is released. In addition, magnitude of the braking force varies depending on vehicle speed when the accelerator is released. Therefore, as exemplified in FIG. 3, the pedal switch controller 26 preferably change the acceleration/deceleration determination value Fac, the first pedal switch threshold Fth1, and the second pedal switch threshold Fth2 depending on the actual vehicle speed V by defining the determination value Fac, the threshold Fth1, and the threshold Fth2 as a function of the actual vehicle speed V.

Here, a function form for the determination value Fac, the threshold Fth1, and the threshold Fth2 are decided by conducting a test for the vehicle 6 in advance. More specifically, for example, after the vehicle 6 is accelerated to its maximum speed, the accelerator pedal is released, then vehicle speed and driving force are measured when the vehicle 6 coasts at about creep vehicle speed, and then the measured value of the driving force is set as the acceleration/deceleration determination value Fac. In addition, a value obtained when the acceleration/deceleration determination value Fac is offset by a predetermined width to a negative side is defined as the first pedal switch threshold Fth1, and a value obtained when the acceleration/deceleration determination value Fac is offset by a predetermined width to a positive side is defined as the second pedal switch threshold Fth2. This makes it possible to switch between the accelerator pedal and the brake pedal at an appropriate timing in consideration of features of the vehicle 6.

Next, a way to set the hysteresis width will be described. As described above, the hysteresis width is set to prevent frequent pedal switch between the accelerator pedal and the brake pedal in the vicinity of the acceleration/deceleration determination value Fac. In addition, the driving force command Fcmd input to the pedal switch controller 26 is defined as a sum of the basic driving force Fbs calculated based on the vehicle speed command Vcmd and the corrective driving force Fbs calculated according to the feedback control law. Therefore, the hysteresis width is set on the basis of rapidity of change in the corrective driving force Fbs changed by the feedback controller 202.

Here, rapidity dF[N] of change in output from the feedback controller 202 obtained during short time dT[s] per unit vehicle speed deviation 1 [km/h] is represented by a product of the short time dT and the integral gain Ki of the feedback controller 202 as indicated by a mathematical expression (2) listed below.

$$dF[N] = Ki \times dT[s] \times 1 \; [\text{km/h}] \quad (2)$$

Therefore, according to the present embodiment, the hysteresis width is set on the basis of a mathematical expression (3) listed below, where the rapidity dF of change in the mathematical expression (2) is the hysteresis width, and the short time dT in the mathematical expression (2) is pedal switch judgment time for a driver. In other words, the pedal switch controller 26 treats the pedal switch judgment time as an adjustment element, and varies the hysteresis width depending on the value of integral gain Ki included in the feedback controller 202. This makes it possible to obtain constant sensitivity to pedal switch time even if the control parameters (Ki and Kp) of the feedback controller 202 are changed.

$$\text{Hysteresis Width} = Ki \times \text{pedal switch judgement time} \quad (3)$$

The following advantageous effects can be achieved by the vehicle speed control device 2 according to the present embodiment.

(1) The vehicle speed control device 2 includes: the driving force command generator 20 that generates a driving force command Fcmd over the vehicle 6 on the basis of actual vehicle speed V and a vehicle speed command Vcmd; the accelerator controller 22 that generates an opening degree command θAC over the accelerator pedal on the basis of the driving force command Fcmd; the brake controller 24 that generates an opening degree command θBK over the brake pedal on the basis of the driving force command Fcmd; and the pedal switch controller 26 that selects, on the basis of the driving force command Fcmd, the accelerator control mode in which the opening degree command θAC is input to the drive robot 3 or the brake control mode in which the opening degree command θBK is input to the drive robot 3. In other words, it is possible for the vehicle speed control device 2 to switch between the accelerator pedal and the brake pedal at a natural timing depending on situations of the vehicle 6 by selecting a control mode on the basis of the driving force command Fcmd generated by the driving force command generator 20 on the basis of the vehicle speed command Vcmd and the actual vehicle speed V.

(2) The driving force command generator of the vehicle speed control device 2 outputs a sum of a basic driving force Fbs and a corrective driving force Ffb as the driving force command Fcmd. The basic driving force Fbs is calculated on the basis of the vehicle speed command V and vehicle weight M. The corrective driving force Ffb is calculated on the basis of a vehicle speed deviation e between the vehicle speed command Vcmd and the actual vehicle speed V. It is possible for the vehicle speed control device 2 to switch between the accelerator pedal and the brake pedal at a natural timing depending on situations of the vehicle 6 and change in the vehicle speed command Vcmd by selecting a control mode on the basis of the driving force command Fcmd including the corrective driving force Ffb calculated by the feedback controller 202.

(3) The accelerator controller 22 of the vehicle speed control device 2 generates the opening degree command θAC over the accelerator pedal by inputting the actual vehicle speed V and the driving force command Fcmd to an accelerator control map Mac that associates generated driving force with the accelerator pedal operation amounts at respective vehicle speeds. It is possible for the vehicle speed control device 2 to speed a response of the accelerator pedal to the command by inputting the driving force command Fcmd generated by using the feedback controller 202 into the accelerator control map Mac and generating the opening degree command θAC.

(4) The brake controller 24 of the vehicle speed control device 2 generates the opening degree command θBK over the brake pedal by inputting the actual vehicle speed V and the driving force command Fcmd to a brake control map Mbk that associates the generated driving force with the brake pedal operation amounts at respective vehicle speeds. It is possible for the vehicle speed control device 2 to speed a response of the brake pedal to the command by inputting the driving force command Fcmd generated by using the feedback controller 202 into the accelerator control map Mac and generating the opening degree command θBK.

(5) The accelerator controller 22 and the brake controller 24 of the vehicle speed control device 2 generate the opening degree commands θAC and θBK by inputting the actual vehicle speed V and the driving force command Fcmd to their respective control maps Mac and Mbk. It is possible for the vehicle speed control device 2 to speed the responses of both the accelerator pedal and the brake pedal to the commands by generating the opening degree commands θAC and θBK on the basis of the control maps Mac and Mbk. In addition, in the vehicle speed control device 2, the feedback controller 202 based on the vehicle speed deviation e between the actual vehicle speed V and the vehicle speed command Vcmd can be shared between the accelerator controller 22 and the brake controller 24. This makes it easier to adjust the control parameter than a case where the respective feedback controllers 202 are individually installed for the accelerator controller 22 and the brake controller 24.

(6) The pedal switch controller 26 of the vehicle speed control device 2 selects the accelerator control mode in a case where the driving force command Fcmd is larger than an acceleration/deceleration determination value Fac, but the pedal switch controller 26 selects the brake control mode in a case where the driving force command Fcmd is smaller than the acceleration/deceleration determination value Fac. It is possible for the vehicle speed control device 2 to select an optimal control mode for each time through simple computation by the pedal switch controller 26.

(7) The pedal switch controller 26 of the vehicle speed control device 2 switches the control mode to the brake control mode in a case where the driving force command Fcmd falls below a first pedal switch threshold Fth1 that is smaller than the acceleration/deceleration determination value Fac in a situation where the accelerator control mode is selected, but the pedal switch controller 26 switches the control mode to the accelerator control mode in a case where the driving force command Fcmd exceeds a second pedal switch threshold Fth2 that is larger than the acceleration/deceleration determination value Fac in a situation where the brake control mode is selected. It is possible for the vehicle speed control device 2 to prevent the control modes to be sensitively switched by setting a hysteresis width between the first pedal switch threshold Fth1 and the second pedal switch threshold Fth2. The first pedal switch threshold Fth1 is used when the control mode is switched from the accelerator control mode to the brake control mode. The second pedal switch threshold Fth2 is used when the control mode is switched from the brake control mode to the accelerator control mode.

(8) The pedal switch controller 26 of the vehicle speed control device 2 changes the acceleration/deceleration determination value Fac, the first pedal switch threshold Fth1, and the second pedal switch threshold Fth2 depending on the actual vehicle speed V. This makes it possible to switch between the accelerator pedal and the brake pedal at an appropriate timing in consideration of features of the vehicle 6.

(9) The pedal switch controller 26 of the vehicle speed control device 2 changes the hysteresis width depending on a value of integral gain Ki included in the feedback controller 202. This makes it possible to omit adjustment of the hysteresis width that is made each time the value of integral gain Ki of the feedback controller 202 is changed, and it becomes easier for a user to do tuning.

The first embodiment of the present invention has been described above. However, the present invention is not limited thereto. Details in the configuration may appropriately be altered without departing the scope of the present invention.

Second Embodiment

Figure 4:
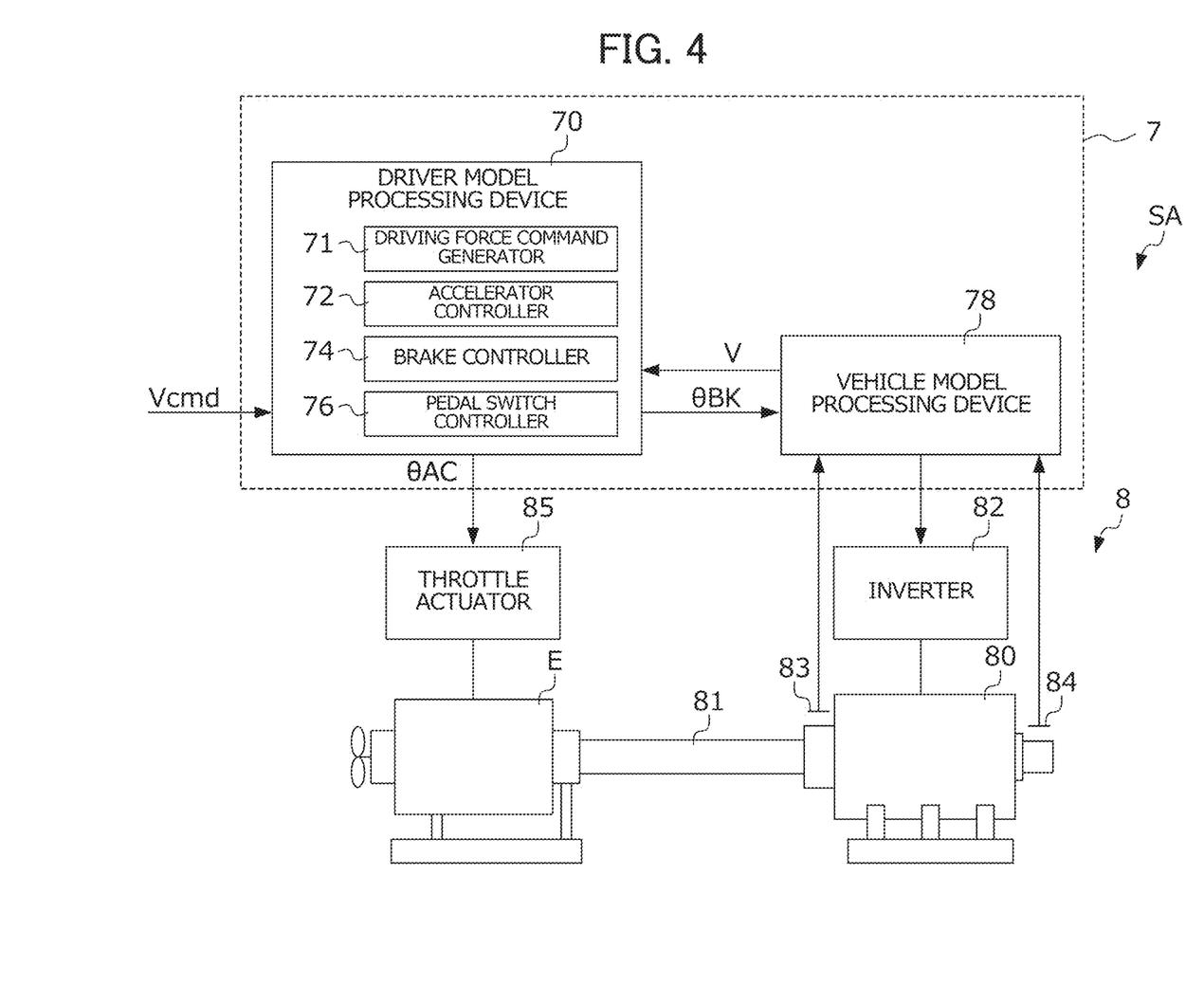
FIG. 4 is a diagram illustrating a configuration of a vehicle testing system having a built-in driver model processing device according to a second embodiment of the present invention.

Next, a second embodiment of the present invention will be described with reference to the drawings. FIG. 4 is a diagram illustrating a configuration of a vehicle testing system SA having a built-in driver model processing device 70 according to the present embodiment.

The vehicle testing system SA is configured to evaluate performances of components by performing a simulation that simulates actual traveling of a virtual vehicle including the components serving as subjects under test. Note that, in this embodiment, an engine E that is a component of the vehicle serves as the subject under test, but the present invention is not limited thereto.

The vehicle testing system SA includes an engine bench system 8 and a control device 7 that controls the engine bench system 8.

The engine bench system 8 includes the engine E serving as the subject under test, a dynamometer 80, a connection shaft 81, an inverter 82, a shaft torque detector 83, an encoder 84, and a throttle actuator 85.

The connection shaft 81 connects an output shaft of the engine E with an output shaft of the dynamometer 80. The shaft torque detector 83 generates a shaft torque detection signal depending on shaft torque of the connection shaft 81, and transmits the signal to the control device 7. The encoder 84 generates a rotation speed detection signal depending on rotation speed of the dynamometer 80, and transmits the signal to the control device 7. The inverter 82 supplies electric power to the dynamometer 80 in response to a torque current command signal input from the control device 7, and thereby causes the dynamometer 80 to generate torque in response to the torque current command signal. The throttle actuator 85 controls a throttle opening degree of the engine E in such a manner that engine torque is generated in response to the opening degree command θAC when the control device 7 inputs the opening degree command θAC over an accelerator pedal of the virtual vehicle mounted with the engine E.

The control device 7 includes the driver model processing device 70 and a vehicle model processing device 78. The driver model processing device 70 generates the opening degree command θAC over the accelerator pedal and the opening degree command θBK over a brake pedal through computation to simulate operations to be performed by a driver on the accelerator pedal and the brake pedal of the virtual vehicle. The vehicle model processing device 78 performs a computation to simulate actual running of the virtual vehicle that travels according to vehicle operation simulated by the driver model processing device 70.

The vehicle model processing device 78 generates the torque current command signal by performing a simulation that simulates actual running of the virtual vehicle on the basis of the shaft torque detection signal, the rotation speed detection signal, and the opening degree command θBK over the brake pedal, and inputs the generated signal to the inverter 82.

The driver model processing device 70 calculates the opening degree command θAC over the accelerator pedal and the opening degree command θBK over the brake pedal by performing a computation to simulate operations to be performed by the driver on the accelerator pedal and the brake pedal on the basis of the actual vehicle speed V of the virtual vehicle calculated through the simulation by the vehicle model processing device 78 and the vehicle speed command Vcmd over the actual vehicle speed V input from a higher-level control device (not illustrated), inputs the opening degree command θAC to the throttle actuator 85, and inputs the opening degree command θBK to the vehicle model processing device 78.

More specifically, the driver model processing device 70 includes a driving force command generator 71, an accelerator controller 72, a brake controller 74, and a pedal switch controller 76, and calculates the opening degree commands θAC, and θBK by using them.

The driving force command generator 71 generates a driving force command, on the basis of the actual vehicle speed V of the virtual vehicle and a vehicle speed command vcmd over the actual vehicle speed V. The driving force command corresponds to a goal value of a driving force to be generated by the virtual vehicle. The accelerator controller 72 generates the opening degree command θAC over the accelerator pedal on the basis of the actual vehicle speed V and the driving force command generated by the driving force command generator 72, and inputs the generated opening degree command θAC to the throttle actuator 85. The brake controller 74 generates the opening degree command θBK over the brake pedal on the basis of the actual vehicle speed V and the driving force command generated by the driving force command generator 71, and inputs the generated opening degree command θBK to the vehicle model processing device 78. On the basis of the actual vehicle speed V and the driving force command, the pedal switch controller 76 selects the accelerator control mode in which the accelerator controller 71 is turned on and the opening degree command θAC is input to the throttle actuator 85, or the brake control mode in which the brake controller 74 is turned on and the opening degree command θBK is input to the vehicle model processing device 78. Note that, detailed configurations of the driving force command generator 71, the accelerator controller 72, the brake controller 74, and the pedal switch controller 76 are respectively the same as the driving force command generator 20, the accelerator controller 22, the brake controller 24, and the pedal switch controller 26 of the vehicle speed control device 2 according to the first embodiment. Therefore, the detailed configurations thereof will be omitted.

The following advantageous effects can be achieved by the driver model processing device 70 according to the present embodiment.

(10) The driver model processing device includes: the driving force command generator 71 that generates a driving force command over a virtual vehicle on the basis of actual vehicle speed V and a vehicle speed command Vcmd; the accelerator controller 72 that generates an opening degree command θAC over an accelerator pedal on the basis of the driving force command; the brake controller 74 that generates an opening degree command θBK over a brake pedal on the basis of the driving force command; and the pedal switch controller 76 that selects, on the basis of the driving force command, the accelerator control mode in which the accelerator controller 72 is turned on or the brake control mode in which the brake controller 74 is turned on. In other words, it is possible for the driver model processing device 70 to simulate a pedal switch operation to be performed by a driver between the accelerator pedal and the brake pedal at a natural timing depending on situations of the virtual vehicle, by selecting a control mode on the basis of the driving force command generated by the driving force command generator 71 on the basis of the vehicle speed command Vcmd and the actual vehicle speed V.

The second embodiment of the present invention has been described above. However, the present invention is not limited thereto. Details in the configuration may appropriately be altered without departing the scope of the present invention.

For example, according to the above-described embodiment, the driver model processing device 7 is incorporated in the vehicle testing system SA that uses the engine E as the subject under test. However, the present invention is not limited thereto. The driver model processing device may be incorporated in a vehicle testing system that uses component of the vehicle other than the engine E such as a transmission or a tire as a subject under test.

EXPLANATION OF REFERENCE NUMERALS

S, SA Vehicle testing system
1 Vehicle speed command generator
2 Vehicle speed control device
20 Driving force command generator
201 Basic driving force calculator
202 Feedback controller
203 Adder
22 Accelerator controller
Mac Accelerator control map
24 Brake controller
Mbk Brake control map
26 Pedal switch controller
3 Drive robot
31 Accelerator actuator
32 Brake actuator
6 Vehicle
7 Control device
70 Driver model processing device
71 Driving force command generator
72 Accelerator controller
74 Brake controller
76 Pedal switch controller
78 Vehicle model processing device
8 Engine bench system

The invention claimed is:

1. A vehicle speed control device, which controls vehicle speed by driving a drive robot that operates an accelerator pedal and a brake pedal of a vehicle, the vehicle speed control device comprising:
a driving force command generator configured to generate a driving force command over the vehicle on a basis of actual vehicle speed of the vehicle and a vehicle speed command over the actual vehicle speed;
an accelerator controller configured to generate an accelerator operation amount command over an accelerator pedal operation amount on a basis of the driving force command;
a brake controller configured to generate a brake operation amount command over a brake pedal operation amount on a basis of the driving force command; and
a pedal switch controller configured to select, on a basis of the driving force command, an accelerator control mode in which the accelerator operation amount command is input to the drive robot or a brake control mode in which the brake operation amount command is input to the drive robot,
wherein the driving force command generator includes
a basic driving force calculator configured to calculate basic driving force on a basis of the vehicle speed command and vehicle weight, a feedback controller provided upstream from the accelerator controller and the brake controller in a flow from the vehicle speed command to the accelerator operation amount command and the brake operation amount command, and configured to calculate corrective driving force so that a vehicle speed deviation between the vehicle speed command and the actual vehicle speed becomes 0, a vehicle speed deviation calculator configured to calculate the vehicle speed deviation by subtracting the actual vehicle speed from the vehicle speed command, and to input the vehicle speed deviation to the feedback controller, and an adder configured to output a sum of the basic driving force and the corrective driving force as the driving force command.

2. The vehicle speed control device according to claim 1, wherein the accelerator controller generates the accelerator operation amount command by inputting the actual vehicle speed and the driving force command to an accelerator control map that associates generated driving force of the vehicle with the accelerator pedal operation amounts at respective vehicle speeds.

3. The vehicle speed control device according to claim 1, wherein the brake controller generates the brake operation amount command by inputting the actual vehicle speed and the driving force command to a brake control map that associates generated driving force of the vehicle with the brake pedal operation amounts at respective vehicle speeds.

4. The vehicle speed control device according to claim 1, wherein the accelerator controller generates the accelerator operation amount command by inputting the actual vehicle speed and the driving force command to an accelerator control map that associates generated driving force of the vehicle with the accelerator pedal operation amounts at respective vehicle speeds, and the brake controller generates the brake operation amount command by inputting the actual vehicle speed and the driving force command to a brake control map that associates the generated driving force with the brake pedal operation amounts at respective vehicle speeds.

5. The vehicle speed control device according to claim 1, wherein the pedal switch controller selects the accelerator control mode in response to the driving force command exceeding an acceleration/deceleration determination value, and the pedal switch controller selects the brake control mode in response to the driving force command falling below the acceleration/deceleration determination value.

6. A vehicle speed control device, which controls vehicle speed by driving a drive robot that operates an accelerator pedal and a brake pedal of a vehicle, the vehicle speed control device comprising:

a driving force command generator configured to generate a driving force command over the vehicle on a basis of actual vehicle speed of the vehicle and a vehicle speed command over the actual vehicle speed;

an accelerator controller configured to generate an accelerator operation amount command over an accelerator pedal operation amount on a basis of the driving force command;

a brake controller configured to generate a brake operation amount command over a brake pedal operation amount on a basis of the driving force command; and a pedal switch controller configured to select an accelerator control mode in which the accelerator operation amount command is input to the drive robot in response to the driving force command exceeding an acceleration/deceleration determination value, and select a brake control mode in which the brake operation amount command is input to the drive robot in response to the driving force command falling below the acceleration/deceleration determination value, wherein the pedal switch controller switches the control mode to the brake control mode in response to the driving force command falls below a first pedal switch threshold that is set to a value smaller than the acceleration/deceleration determination value in a situation where the accelerator control mode is selected as the control mode, and the pedal switch controller switches the control mode to the accelerator control mode in response to the driving force command exceeds a second pedal switch threshold that is set to a value larger than the acceleration/deceleration determination value in a situation where the brake control mode is selected as the control mode.

7. The vehicle speed control device according to claim 6, wherein the pedal switch controller changes the acceleration/deceleration determination value, the first pedal switch threshold, and the second pedal switch threshold depending on the actual vehicle speed.

8. The vehicle speed control device according to claim 6, wherein the driving force command generator includes a basic driving force calculator configured to calculate basic driving force on a basis of the vehicle speed command and vehicle weight, a feedback controller configured to calculate corrective driving force on a basis of a deviation between the vehicle speed command and the actual vehicle speed, and an adder configured to output a sum of the basic driving force and the corrective driving force as the driving force command, and wherein the pedal switch controller changes a difference between the first pedal switch threshold and the second pedal switch threshold depending on a value of a control parameter included in the feedback controller.

9. A driver model processing device, which simulates operations to be performed on an accelerator pedal and a brake pedal of a vehicle by a driver, the driver model processing device comprising:

a driving force command generator configured to generate a driving force command over the vehicle on a basis of actual vehicle speed of the vehicle and a vehicle speed command over the actual vehicle speed;

an accelerator controller configured to generate an accelerator operation amount command over an accelerator pedal operation amount on a basis of the driving force command;

a brake controller configured to generate a brake operation amount command over a brake pedal operation amount on a basis of the driving force command; and a pedal switch controller configured to select, on a basis of the driving force command, an accelerator control mode in which the accelerator controller is turned on or a brake control mode in which the brake controller is turned on, wherein the driving force command generator includes a basic driving force calculator configured to calculate basic driving force on a basis of the vehicle speed command and vehicle weight, a feedback controller provided upstream from the accelerator controller and the brake controller in a flow from the vehicle speed command to the accelerator operation amount command and the brake operation amount command, and configured to calculate corrective driving force so that a vehicle speed deviation between the vehicle speed command and the actual vehicle speed becomes 0, a vehicle speed deviation calculator configured to calculate the vehicle speed deviation by subtracting the actual vehicle speed from the vehicle speed command, and to input the vehicle speed deviation to the feedback controller, and an adder configured to output a sum of the basic driving force and the corrective driving force as the driving force command.

* * * * *